United States Patent [19]

Gleasman et al.

[11] Patent Number: 4,732,053

[45] Date of Patent: Mar. 22, 1988

[54] MULTI-AXLE VEHICLE STEER DRIVE SYSTEM

[76] Inventors: Vernon E. Gleasman, 11 Pondview Dr., Pittsford, N.Y. 14534; Keith E. Gleasman, 11 McCord Woods Dr., Fairport, N.Y. 14450

[21] Appl. No.: 668,313

[22] Filed: Nov. 5, 1984

Related U.S. Application Data

[63] Continuation-in-part of Ser. No. 544,390, Oct. 21, 1983, abandoned.

[51] Int. Cl.[4] ................. B62D 11/02; F16H 37/10; B60G 11/18
[52] U.S. Cl. ................................... 74/665 L; 74/710; 74/715; 180/6.44; 280/43.23; 280/700; 280/723
[58] Field of Search ............... 74/710, 711, 715, 24.03, 74/665 L; 180/22, 23, 24, 24.04, 6.44, 240; 280/6 H, 43.17, 43.23, 700, 721, 723

[56] References Cited

U.S. PATENT DOCUMENTS

| | | | |
|---|---|---|---|
| 2,213,473 | 9/1940 | Peterman | 180/24.03 |
| 2,332,838 | 10/1943 | Borgward | 180/6.44 X |
| 2,367,151 | 1/1945 | Stephen | 180/24.09 |
| 2,390,218 | 12/1945 | Lamb et al. | 180/22 X |
| 2,522,193 | 9/1950 | Randall | 180/24.03 |
| 2,542,157 | 2/1951 | Odom | 74/710 |
| 2,730,182 | 1/1956 | Sloane | 180/6.44 |
| 2,763,164 | 9/1956 | Neklutin | 180/6.44 X |
| 2,859,641 | 11/1958 | Gleasman | 74/715 |
| 2,975,655 | 3/1961 | Cox | 74/790 X |
| 3,095,213 | 6/1963 | Hair | 280/723 |
| 3,095,761 | 7/1963 | Hilado | 74/715 |
| 3,199,890 | 8/1965 | Caldwell | 280/43.23 |
| 3,237,959 | 3/1966 | Heyl | 280/43.23 |
| 3,316,992 | 5/1967 | Schindler | 180/6.44 X |
| 3,343,620 | 9/1967 | Karavias | 180/24 X |
| 3,351,037 | 11/1967 | Meili | 180/24 X |
| 3,390,593 | 7/1968 | Brownyer | 180/23 X |
| 3,490,786 | 1/1970 | Ravenel | 280/721 |
| 3,762,487 | 10/1973 | Bilas | 180/24.09 |
| 3,906,812 | 9/1975 | Kagata | 74/711 |
| 4,191,071 | 3/1980 | Gleasman et al. | 74/715 |
| 4,290,321 | 9/1981 | Wilson | 74/711 |
| 4,325,443 | 4/1982 | Fischer et al. | 180/22 X |
| 4,417,634 | 11/1983 | Quaeck et al. | 180/22 |
| 4,491,035 | 1/1985 | Gleasman et al. | 74/715 |
| 4,560,018 | 12/1985 | Satzler | 74/391 X |

FOREIGN PATENT DOCUMENTS

| | | | |
|---|---|---|---|
| 1160313 | 12/1963 | Fed. Rep. of Germany | |
| 1680141 | 9/1971 | Fed. Rep. of Germany | 280/6 H |
| 323334 | 12/1934 | Italy | 180/6.44 |
| 328647 | 5/1930 | United Kingdom | 180/24.04 |
| 506961 | 6/1939 | United Kingdom | 280/721 |
| 707655 | 4/1954 | United Kingdom | 180/6.44 |

Primary Examiner—Rodney H. Bonck
Assistant Examiner—Richard M. Lorence
Attorney, Agent, or Firm—Stonebraker, Shepard & Stephens

[57] ABSTRACT

A multi-axle vehicle steer drive system divides driving torque with a driving differential 15 and steering torque with a steering differential 20 and combines the divided torque outputs additively on one side of the vehicle and subtractively on the other side of the vehicle. This produces steer driving torque distributed via axle differentials 50 and 51 between left and right side drive axles. By using unlimited-slip differentials for dividing the driving and steering torque and no-slip differentials for distributing the steer driving torque between drive axles, the vehicle applies torque to the wheels with the best traction and drives all wheels proportionally to their tracking ability.

14 Claims, 13 Drawing Figures

MULTI-AXLE VEHICLE STEER DRIVE SYSTEM

RELATED APPLICATIONS

This application is a continuation-in-part of parent application Ser. No. 544,390, filed Oct. 21, 1983 now abandoned, entitled NO-SLIP, IMPOSED DIFFERENTIAL, the disclosure of which is included in co-pending successor application Ser. No. 27,741, filed Mar. 19, 1987.

BACKGROUND

This invention arose from a need to apply our differential steer drive system to multi-drive-axle vehicles. Our system, as explained in our copending U.S. patent application Ser. No. 544,390, filed Oct. 21, 1983, now abandoned, entitled NO-SLIP, IMPOSED DIFFERENTIAL, accomplishes both steer drive and no-slip differentiation for a pair of drive axles. By this invention we have devised ways of applying our no-slip, imposed differential steer drive to two or more pairs of drive axles. This can be used in many multi-drive-wheel vehicles such as tractors, loaders, fork lifts, and specialized carriers and haulers.

This invention accomplishes both no-slip differentiation among a number of drive axles and imposed differentiation between right and left side drive axles for steering purposes. It also achieves this simply, inexpensively, and reliably with mechanisms that are durable and serviceable.

SUMMARY OF THE INVENTION

Our multi-axle vehicle steer drive system uses a driving differential for dividing driving torque and a steering differential for dividing steering torque. The divided torque outputs of the driving and steering differentials are combined additively on one side of the vehicle and subtractively on the other side of the vehicle. Right and left side axle differentials then divide right and left side steer driving torque between drive axles. The axle differentials are preferably limited-slip or no-slip differentials, and the driving and steering differentials are preferably unlimited-slip differentials. The drive train can be contained within a vehicle hull from which outboard drive axles extend, and reduction gears can power the drive axles. A powered torsion bar suspension system can raise and lower the drive wheels relative to the hull.

DRAWINGS

Figure 3:
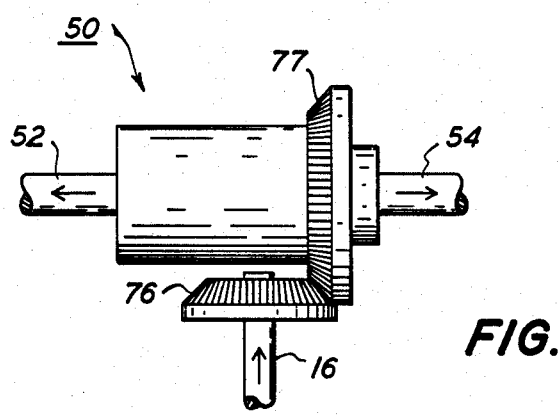
Figure 4:
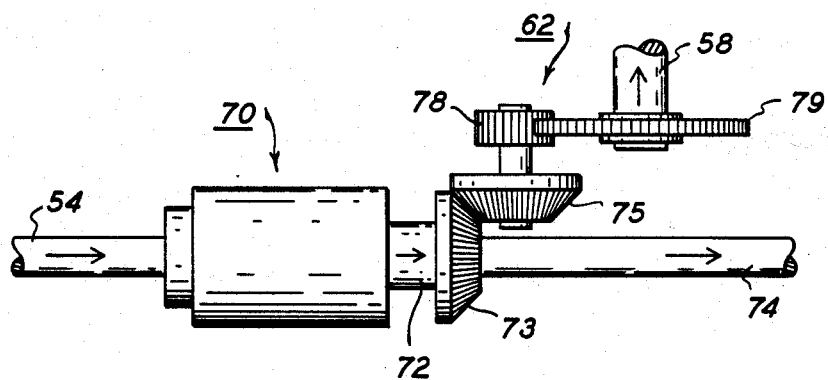
Figure 5:
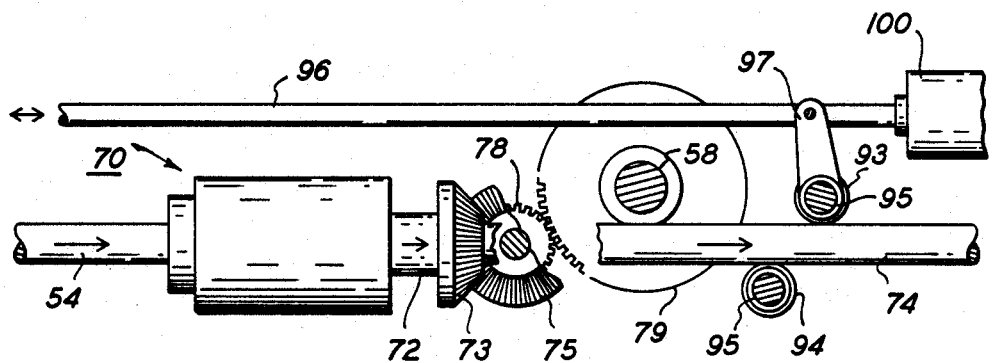
Figure 6:
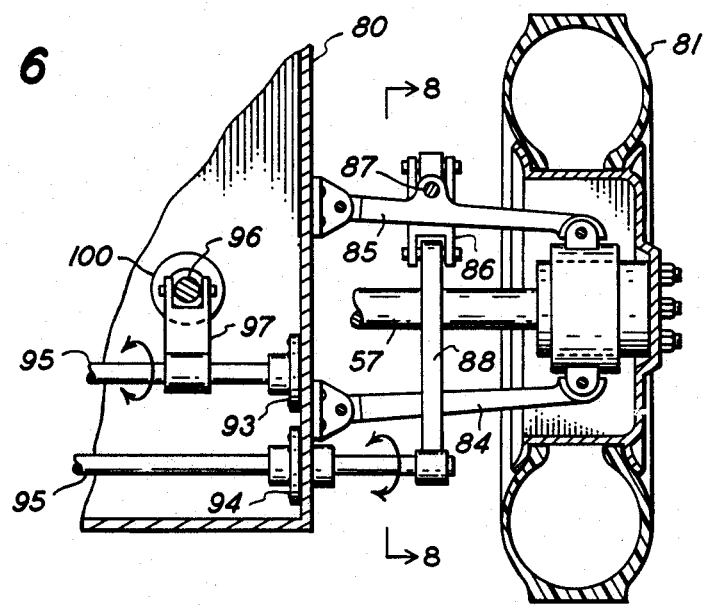
Figure 7:
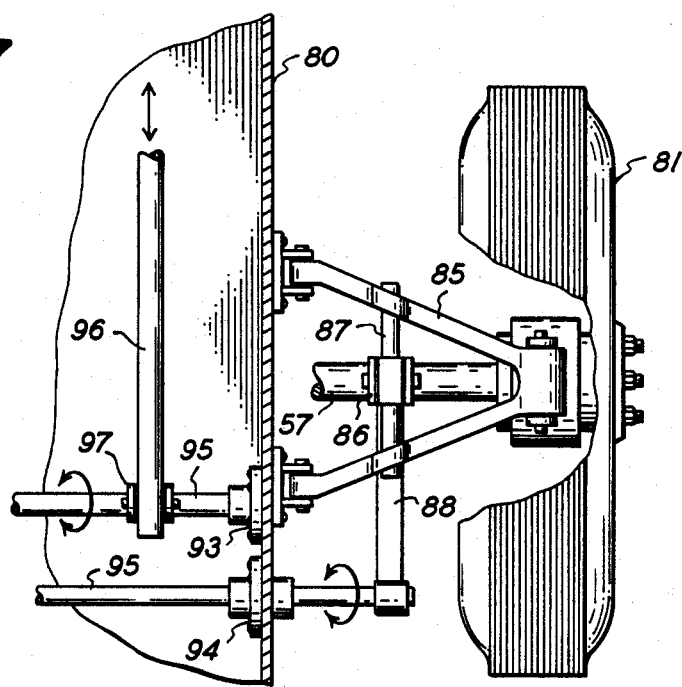
Figure 8:
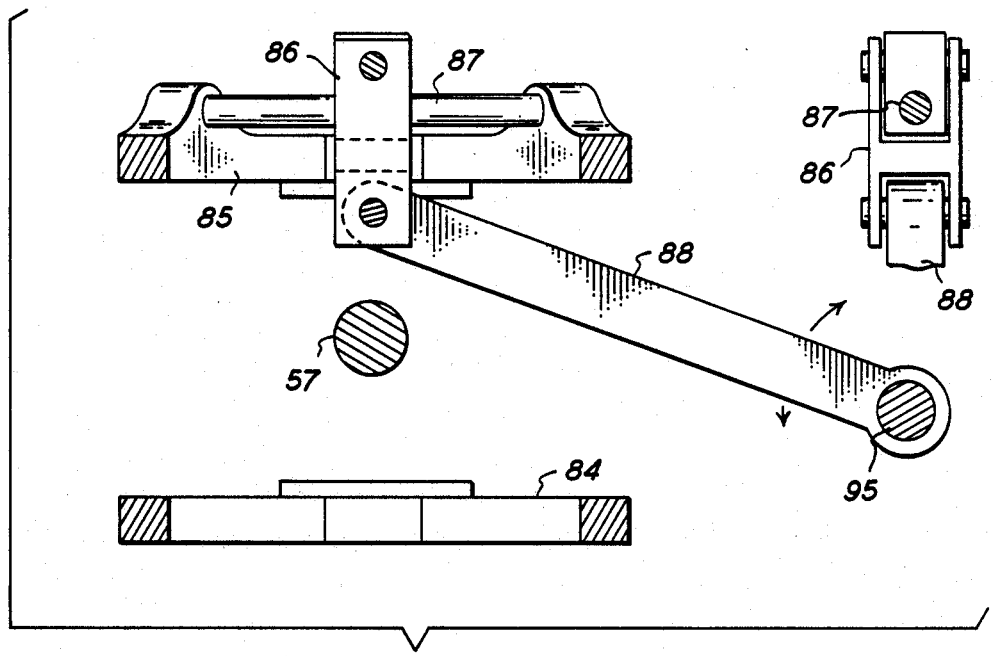
Figure 9:
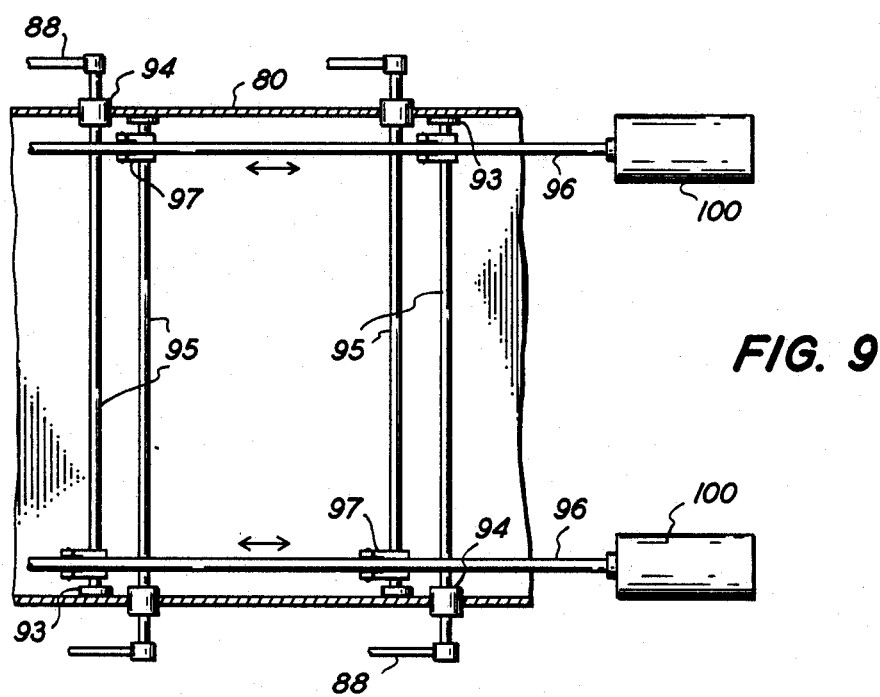
Figure 10:
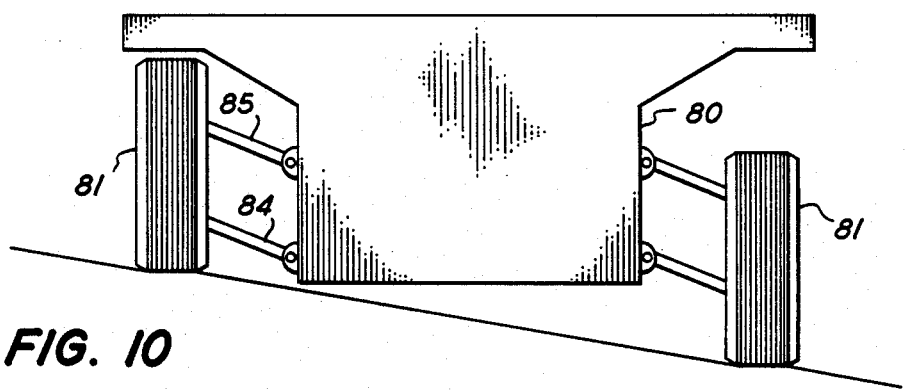
Figure 11:
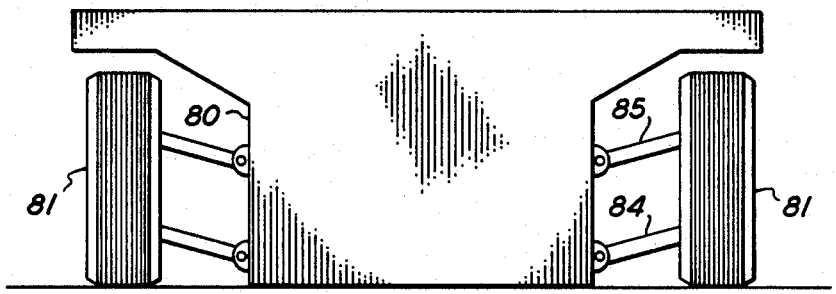
Figure 12:
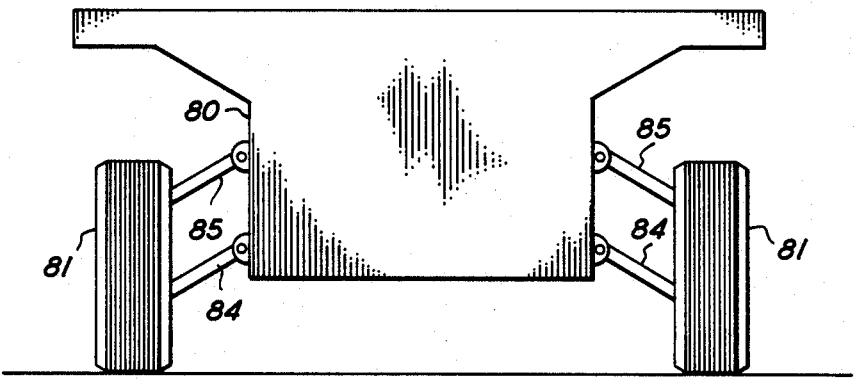
Figure 13:
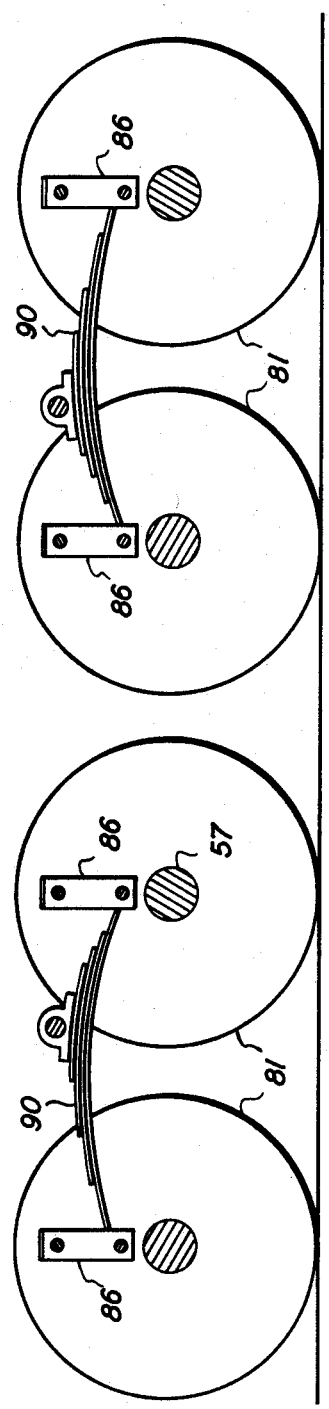

FIG. 3 schematically shows an axle differential in a T-configuration for use in our steer drive system;

FIG. 4 schematically shows an axle differential in an incline configuration accompanied by a drive axle reduction gear for use in our steer drive system;

FIG. 5 is a partially schematic, partially cutaway, side elevational view of the axle differential and reduction gear of FIG. 4;

FIG. 6 is a partially schematic, partially crosssectional view of a vehicle hull with drive axle suspensions for use with our steer drive system;

FIG. 7 is a fragmentary plan view of a wheel suspension for the vehicle of FIG. 6;

FIG. 8 is a cross-sectional view of a wheel suspension of the vehicle of FIG. 6, taken along the line 8—8 thereof;

FIG. 9 is a partially schematic view of a torsion bar system for drive axle suspensions such as shown in FIGS. 6–8;

FIGS. 10, 11, and 12 schematically show different drive axle suspension possibilities achievable with the arrangement of FIGS. 6–8; and FIG. 13 schematically shows a leaf spring suspension for wheels driven by the inventive system.

DETAILED DESCRIPTION

Our multi-axle vehicle steer drive system includes a drive train that receives driving torque and steering torque, combines these into a steer driving torque divided between right and left sides of the vehicle, and differentiates the right and left side torques between right and left side drive axles. Our invention also includes drive train and wheel suspension features that cooperate with a steer drive system to produce a versatile and effective vehicle.

No-slip, Imposed Differential

Figure 2:
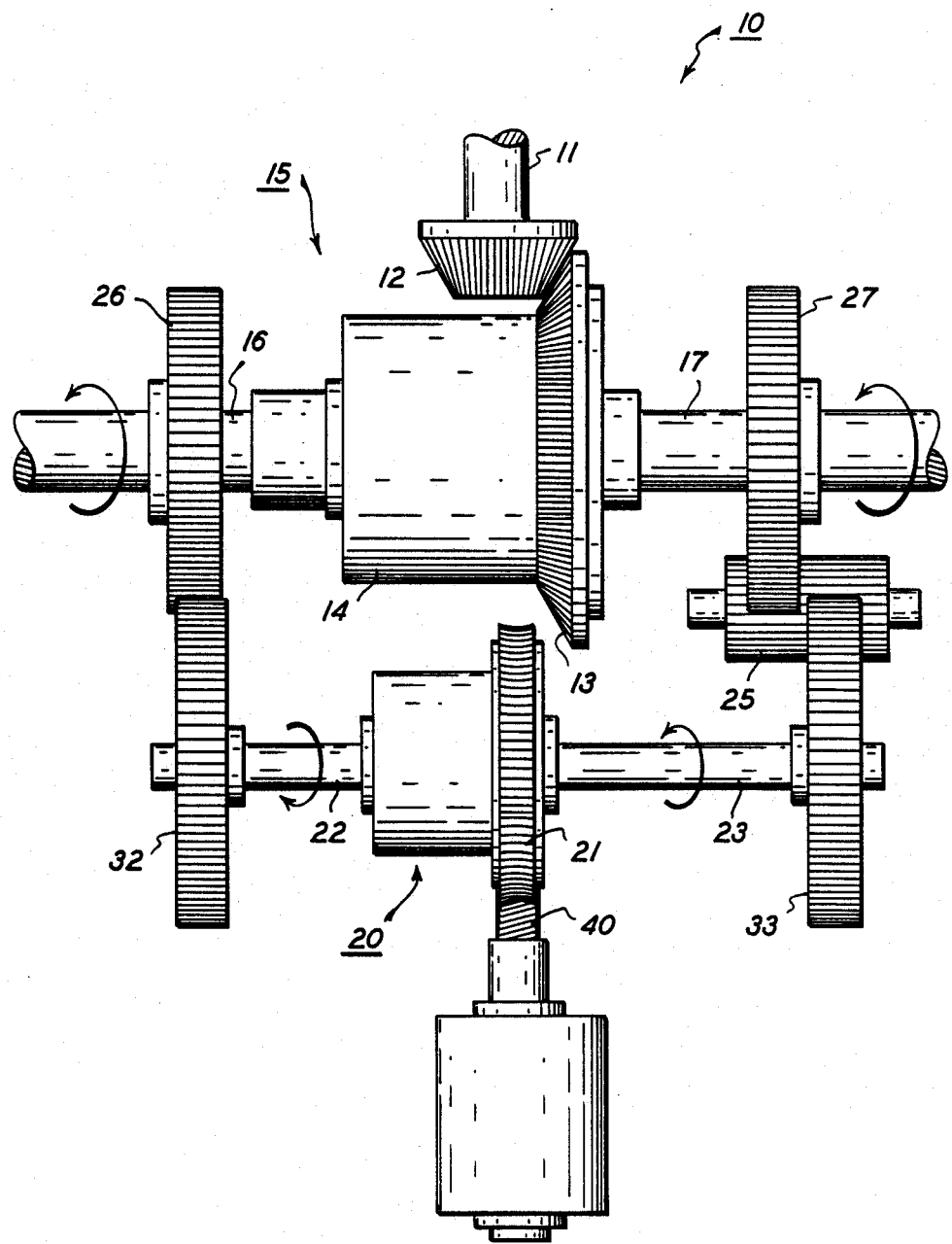
FIG. 2 is a partially schematic view of a preferred embodiment of our no-slip, imposed differential used in our multi-axle steer drive system.

As shown in FIG. 2, engine power input via shaft 11 turning gear 12 rotates ring gear 13 and case 14 of a conventional, unlimited-slip differential 15 connected for driving a pair of output shafts 16 and 17 transmitting the divided torque to opposite sides of the vehicle. Differential 15 is preferably a bevel gear differential lacking any limited-slip devices so as not to impair differential rotation of shafts 16 and 17. As such, drive differential 15 is well understood in the power transmission art and can be suitably sized to the vehicle being driven.

A second, control or steering differential 20, also of a conventional, unlimited-slip design, is connected between a pair of control shafts 22 and 23 that are interconnected in a driving relationship with output shafts 16 and 17. Steering torque divided between control shafts 22 and 23 is combined with driving torque on shafts 16 and 17 additively on one side of the vehicle and subtractively on the other side of the vehicle. Thus, although these connections can be reversed, right control shaft 23 and right output shaft 17 are connected for rotation in the same direction, and left control shaft 22 and left output shaft 16 are connected for rotation in opposite directions. This causes counter or differential rotation of control shafts 22 and 23 as output shafts 16 and 17 rotate in the same direction and conversely causes differential rotation of output shafts 16 and 17 as control shafts 22 and 23 rotate in the same direction.

Gear connections between control shafts and output shafts as shown in FIG. 2 are preferred for larger and more powerful vehicles. These include output shaft gears 26 and 27 fixed respectively to output shafts 16 and 17 and control shaft gears 32 and 33 fixed respectively to control shafts 22 and 23. Meshing output shaft gear 26 with control shaft gear 32 provides opposite or subtractive rotation between output shaft 16 and control shaft 22, and meshing both output shaft gear 27 and control shaft gear 33 with idler gear 25 provides same direction or additive rotation for output shaft 17 and control shaft 23.

Gear connections between control shafts and output shafts are preferably incorporated into an enlarged housing containing both driving differential 15 and steering differential 20. For a reason explained below, steering differential 20 can be sized to bear half the force borne by driving differential 15 so that the complete assembly can be fitted within a differential housing that is not unduly large.

Smaller or less powerful vehicles can use shaft interconnections such as belts or chains in place of gearing. Also, shaft interconnections need not be limited to the region of the driving differential and can be made toward the outer ends of the output shafts.

A gear or drive ratio between control shafts and output shafts is preferably 1:1. This ratio can vary, however, so long as it is the same on opposite sides of the driving and steering differentials.

A steering input gear 40 meshes with a ring gear 21 of steering differential 20 for imposing differential rotation on the output shafts 16 and 17. Gear 40 is preferably a worm gear, and ring gear 21 is preferably a worm wheel so that ring gear 21 turns only when gear 40 turns.

Gear 40 can be turned by a steering shaft manually turned by a driver. Steering mechanisms can also use motors for turning gear 40 or otherwise rotating differential 20 to impose steering torque on control shafts 22 and 23. Alternatives include a DC starter motor 41 electrically turned via a rheostat in a steering system and a hydraulic, hydrostatic, or pneumatic motor turned by a vehicle's hydraulic or pneumatic system in response to a steering control.

Two important effects occur from interconnecting steering differential 20 and its control shafts 22 and 23 with driving differential 15 and its output shafts 16 and 17. One is a no-slip drive that prevents wheels from slipping unless slippage occurs on both sides of the vehicle at once. The other is imposed differential rotation that pivots or turns a vehicle for steering.

The no-slip drive occurs because output shafts 16 and 17 are geared together via differential 20. Torque applied to an output shaft on a side of the vehicle that has lost traction is transmitted to the connecting control shaft on that side, through differential 20 to the opposite control shaft, and back to the opposite output shaft where it is added to the side having traction. So if one side of the vehicle loses traction, the opposite side drives harder; and the only way slippage can occur is if both sides lose traction simultaneously.

To elaborate on this, consider a vehicle rolling straight ahead with left and right shafts 16 and 17 turning uniformly in the same direction. Control gear 40 is stationary for straight ahead motion; and since control gear 40 is preferably a worm gear, worm wheel 21 of control differential 20 cannot turn. Control shafts 22 and 23, by their driving connections with the output shafts, rotate differentially in opposite directions, which control differential 20 accommodates.

Driving differential 15 equally divides the input torque between output shafts 16 and 17. If left side wheels lose traction, left shaft 16 cannot apply its available torque and tends to slip. Actual slippage cannot occur, however, because output shaft 16 is geared to control shaft 22. So if wheels lacking traction cannot receive torque from shaft 16, this is transmitted to control shaft 22, which rotates in an opposite direction from shaft 16. Since ring gear 21 cannot turn, rotational power on control shaft 22 is transmitted through differential 20 to produce opposite rotation of control shaft 23. This is geared to output shaft 17 via idler gear 25 so that power on control shaft 23 is applied to urge shaft 17 in a forward direction driving the wheels that have traction and can accept the available torque. Since only one-half of the full available power can be transmitted from one output shaft to another via differential 20 and its control shafts, these can be sized to bear one-half the force borne by driving differential 15 and its output shafts.

Of course, unusable power available on right shaft 17, because of a loss of traction on that side of the vehicle, is transmitted through the same control shaft and control differential route to left shaft 16. This arrangement applies the most power to the wheels having the best traction, which is ideal for advancing the vehicle. The wheels that have lost traction will maintain rolling engagement with the ground while the other wheels drive. The only time wheels can slip is when they all lose traction simultaneously.

Differential rotation imposed on output shafts 16 and 17 pivots or turns the vehicle because of the different distances traveled by differentially rotating wheels on opposite sides of the vehicle. Differential steering rotation is supplied by steering torque input to steering differential 20. This divides the steering torque between control shafts 22 and 23, which rotate in the same direction in response to steering input torque. Combining the steering torque output of shafts 22 and 23 additively on one side of the vehicle and subtractively on the other side of the vehicle causes differential rotation of output shafts 16 and 17, causing differential wheel rotation for turning or pivoting. Steering controlled by torque input to steering differential 20 can be applied to wheeled vehicles that steer without using turning wheels. It can also be used for differentially rotating driving wheels to provide powerassisted steering for a vehicle that also has turning wheels.

A preferred way of inputting steering torque is by turning control gear 40, which rotates ring gear 21, which turns the casing of differential 20 to rotate control shafts 22 and 23 in the same direction. The connection of control shafts 22 and 23 with output shafts 16 and 17 converts the same direction rotation of control shafts 22 and 23 to opposite, differential rotation of output shafts 16 and 17, which driving differential 15 accommodates. This drives wheels forward on one side of the vehicle and rearward on the other side of the vehicle, depending on the direction of rotation of control gear 40.

Such differential rotation is added to whatever forward or rearward rotation of the output shafts is occurring at the time. So if a vehicle is moving forward or backward when control gear 40 turns, the differential rotation advances and retards opposite output shafts and makes the vehicle turn. If a vehicle is not otherwise moving when control gear 40 turns, wheels go forward on one side and backward on the other side so that the vehicle pivots on a central point.

Torque Distribution

A system of axle differentials distributes steer driving torque from output shafts 16 and 17 along respective right and left sides of the vehicle. Axle differentials 50 and 51 divide torque from output shafts 16 and 17 respectively between drive shafts 52 and 54 and drive shafts 53 and 55 extending along respective right and left sides of the vehicle. This can be done with a conventional T-configuration differential as shown schematically in FIG. 3 for axle differential 50. Input from shaft 16 turns a ring gear 77 rotating the casing of differential 50 to divide torque between output shafts 52 and 54.

Although axle differentials 50 and 51 can be conventional bevel gear differentials, these have the disadvantage of directing torque to whichever wheel has the least traction, so we prefer that axle differentials 50 and 51 be limited-slip or no-slip differentials. Choices include limited-slip differentials with clutch mechanisms; differentials with locking devices; and no-slip, worm differentials, which we prefer. High bias or no-slip capability for axle differentials 50 and 51 directs the torque available on each side of the vehicle to the wheels having the best traction.

Figure 1:
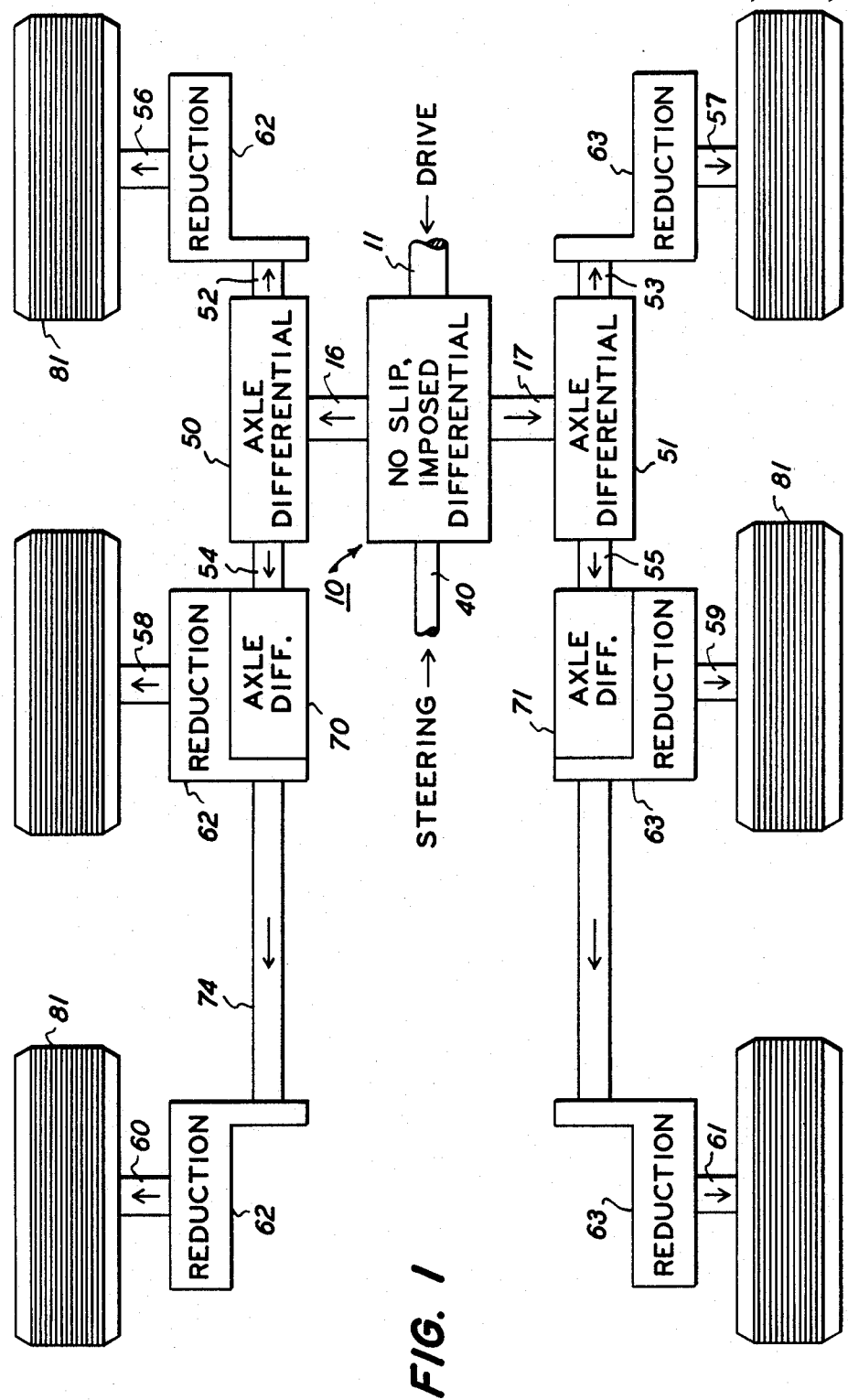
FIG. 1 is a schematic view of a preferred embodiment of our steer drive system for a multi-axle vehicle.

Our steer drive system can apply to any number of drive axles for a vehicle, and FIG. 1 schematically represents a variation having two drive axles 56 and 57 forward of axle differentials 50 and 51 and four drive axles 58–61 rearward of axle differentials 50 and 51. The two forward drive axles 56 and 57 receive torque directly from shafts 52 and 53 via reduction gears 62 and 63, which are preferred to allow smaller size and higher speed distribution shafts to turn larger size and higher torque axle shafts.

The four rearward drive axles receive torque via additional axle differentials 70 and 71, having an inline configuration. These divide torque respectively between drive axle shafts 58 and 60 on the left side and drive axles 59 and 61 on the right side. Again, reduction gears 62 and 63 preferably apply torque from axle differentials 70 and 71 to each pair of drive axles.

For a differential having an inline configuration, such as differential 70 shown in FIGS. 4 and 5, torque from input shaft 54 directly rotates the differential casing within which torque divides between a hollow output shaft 72 surrounding a coaxial output shaft 74. Hollow shaft 72 drives bevel gear 73 meshed with bevel gear 75 turning pinion 78 driving bull gear 79 forming reduction gear 62 for drive axle 58. Axle differentials 70 and 71 are also preferably limited-slip or no-slip differentials; and again we prefer no-slip, worm differentials for their ability to distribute torque to the wheels with the best traction.

Reduction gears are not required and, if used, can have forms other than the one schematically illustrated. Any number of axles can be arranged forward or rearward of output shafts 16 and 17, and the vehicle need not have left and right axles opposed to each other or even have the same number of drive axles on each side. Wheels and axles that do not drive can be included, and a vehicle can have a combination of turning or steering wheels and steer drive wheels that rotate only.

Suspension System Cooperating with Steer Drive

One preferred way of arranging our steer drive system in a special vehicle is shown in FIGS. 6–13. The illustrated vehicle, which is only one of countless possibilities, includes a hull 80 containing our steer drive system inboard and from which drive axles and wheel suspensions extend outboard.

Preferred suspensions for wheels 81 include upper and lower A-frames 85 and 84. Shackles 86 mounted on cross pieces 87 of upper A-frames 85 connect either to the ends of leaf springs 90 as shown schematically in FIG. 13 or to arms 88 of torsion bars 95. Each torsion bar 95 passes through a support bearing 94 in hull 80 and extends across the bottom of hull 80 to an end support bearing 93. A pair of longitudinally movable rods 96, arranged along each side of hull 80, are coupled to radial arms 97 splined to each torsion bar 95. As rods 96 move, they vary the rotational orientation of the torsion bars and thus determine the height of the wheel suspensions relative to hull 80. Although many different power systems can drive torsion bar adjusting rods 96, we prefer a pair of hydraulic cylinders 100. A pair of universal joints (not shown) are arranged at the inner and outer ends of each drive axle 57 to accommodate rotation at varying angles to hull 80.

Some of the effects possible with torsion bar suspension systems independently powered for each side of the vehicle are schematically shown in FIGS. 8–10. Torsion bars can raise wheels on one side of hull 80 and lower wheels on the other side of hull 80 for traversing or standing on a side hill location as shown in FIG. 8. Raising wheel suspensions on both sides at once lowers hull 80 to the ground as shown in FIG. 9. This can also be used for driving an amphibious vehicle onto a beach while its wheels are up. Lowering wheels 81 on both sides of hull 80 as shown in FIG. 10 can raise the hull above the ground for travel. This can be used for running an amphibious vehicle inland after landing on a beach. Also, powered torsion bars can adjust the vehicle height for travel in snow or through wet land.

Powered torsion bar suspensions cooperate well with our steer drive system arranged in vehicle hull 80. Distribution shafts, axle differentials, and reduction gears can fit compactly in the lower inboard sides of the hull; and pairs of torsion bars cross closely by each other in a midregion of the hull bottom. With drive wheels enabled to raise and lower relative to hull 80, and with a steer drive system that applies torque to the wheels with the best traction, the result is a versatile vehicle with powerful tracking force able to traverse difficult terrain.

We claim:

1. A steer drive system for a vehicle having a hull and a plurality of axle shafts extending outward from each side of said hull, said steer drive system comprising:

a. a drive differential and a steering control differential arranged within said hull so that said drive differential receives drive torque divided between right and left drive shafts and said steering control differential receives independently generated steering control torque via a worm and worm wheel reduction drive and applies said steering control torque additively and subtractively to said right and left drive shafts to provide steer driving torque;

b. a worm differential arranged in a right side of said hull for receiving steer driving torque from said right drive shaft and dividing said steer driving torque between a pair of said drive axles on said right side of said hull;

c. a worm differential arranged in a left side of said hull for receiving steer driving torque from said left drive shaft and dividing said steer driving torque between a pair of said drive axles on said left side of said hull;

d. torsion bar suspensions arranged within said hull and extending through said hull for springing wheels driven by said drive axles; and e. a hydraulic system arranged within said hull for rotating said torsion bars to raise and lower said wheels.

2. The steer drive system of claim 1 including reduction gears arranged within said hull and driven by said worm differentials for each of said drive axles.

3. The steer drive system of claim 1 including a plurality of said worm differentials within each of said right and left sides of said hull, each of said worm differentials being arranged to divide torque between successive pairs of said drive axles.

4. A multi-axle steer drive vehicle having at least two drive axles extending outboard on each side of a hull, said vehicle comprising:
   a. a right side worm differential and a left side worm differential arranged within said hull for dividing steer driving torque respectively between said right side drive axles and said left side drive axles;
   b. a steering control differential arranged within said hull for receiving steering control torque via a worm and worm wheel reduction drive to provide a steering torque output combined with a driving torque output from a drive differential to form steer driving torque divided between said right and left worm differentials;
   c. torsion bars anchored within one side of said hull and extending through an opposite side of said hull for springing wheels driven by said drive axles; and
   d. a hydraulic system arranged within said hull for rotating the anchorages of said torsion bars for raising and lowering said wheels relative to said hull.

5. The vehicle of claim 4 including reduction gears arranged within said hull and driven by said worm differentials for each of said drive axles.

6. The vehicle of claim 4 wherein said hydraulic system is arranged for separately rotating said anchorages for right and left side torsion bars to allow said right and left side wheels to be set at different heights.

7. A method of steer driving a multi-axle vehicle, said method comprising:
   a. differentially combining driving torque and independently generated steering control torque delivered via a worm and worm wheel reduction drive to produce steer driving torque divided between right and left sides of a hull of said vehicle;
   b. using a right side worm differential for dividing right side steer driving torque between a pair of right side drive axles, and using a left side worm differential for dividing left side steer driving torque between a pair of left side drive axles;
   c. using torsion bars anchored within one side of said hull and extending outboard of an opposite side of said hull for springing wheels driven by said axles; and
   d. using a hydraulic system for rotating the anchorages of said torsion bars for raising and lowering said wheels relative to said hull.

8. The method of claim 7 including arranging said hydraulic system for separately rotating the anchorages of said torsion bars on opposite sides of said hull for independently setting the level of wheels on right and left sides of said hull.

9. A system of steer driving multiple axles on both sides of a vehicle, said system comprising:
   a. a right side worm differential arranged for dividing steer driving torque between a pair of axles on a right side of said vehicle, and a left side worm differential arranged for dividing steer driving torque between a pair of axles on a left side of said vehicle;
   b. a drive differential arranged for dividing driving torque between drive shafts transmitting to said right and left worm differentials; and
   c. an unlimited slip steering control differential having a casing receiving steering control input via a worm and worm wheel reduction drive, said steering control differential transmitting said steering control input to control shafts coupled additively and subtractively with said drive shafts for combining said steering control input continuously with said driving torque to provide said steer driving torque transmitted to said right and left worm differentials.

10. The system of claim 9 including a second worm differential on a right side of said vehicle for dividing said steer driving torque between one of said paired axles and a third right side axle, and a second worm differential on a left side of said vehicle for dividing said steer driving torque between one of said paired axles and a third left side axle.

11. The system of claim 9 including a number n of said worm differentials on said right and left sides of said vehicle for dividing said steer driving torque between a number n+1 of said right and left side axles.

12. The system of claim 9 wherein said vehicle has a hull from which said drive axles extend outboard and said worm differentials and said drive and steering differentials are arranged within said hull.

13. The system of claim 12 including torsion bars anchored within one side of said hull and extending through an opposite side of said hull for springing wheels mounted on said axles.

14. The system of claim 13 including a hydraulic system for pivoting the anchorages of said torsion bars for raising and lowering said wheels.

* * * * *